United States Patent
Scott et al.

(10) Patent No.: US 10,635,942 B2
(45) Date of Patent: Apr. 28, 2020

(54) METHOD AND APPARATUS FOR IDENTIFYING A PRODUCT

(71) Applicant: Shenzhen Malong Technologies Co., Ltd., Shenzhen (CN)

(72) Inventors: Matthew Robert Scott, Shenzhen (CN); Dinglong Huang, Shenzhen (CN); Kai Fu, Shenzhen (CN)

(73) Assignee: Shenzhen Malong Technologies Co., Ltd., Shenzhen (CN)

( * ) Notice: Subject to any disclaimer, the term of this patent is extended or adjusted under 35 U.S.C. 154(b) by 150 days.

(21) Appl. No.: 15/960,952

(22) Filed: Apr. 24, 2018

(65) Prior Publication Data

US 2019/0156152 A1 May 23, 2019

(30) Foreign Application Priority Data

Nov. 23, 2017 (CN) .......................... 2017 1 1180389

(51) Int. Cl.
*G06K 9/62* (2006.01)
*G06K 9/32* (2006.01)

(52) U.S. Cl.
CPC .......... *G06K 9/6261* (2013.01); *G06K 9/325* (2013.01); *G06K 2209/01* (2013.01); *G06K 2209/013* (2013.01); *G06K 2209/17* (2013.01)

(58) Field of Classification Search
CPC ............. G06K 2209/01; G06K 9/4604; G06K 9/00463; G06K 9/32; G06K 9/3258
See application file for complete search history.

(56) References Cited

U.S. PATENT DOCUMENTS

| | | | |
|---|---|---|---|
| 5,909,509 A * | 6/1999 | Chiang | G06K 9/6857 382/159 |
| 6,584,223 B1 * | 6/2003 | Shiiyama | G06F 16/5838 382/173 |
| 7,508,998 B2 * | 3/2009 | Shiiyama | G06K 9/6202 382/305 |
| 7,660,468 B2 * | 2/2010 | Gokturk | G06K 9/46 382/224 |
| 7,796,817 B2 * | 9/2010 | Hotta | G06K 9/346 382/181 |
| 7,949,191 B1 * | 5/2011 | Ramkumar | G06K 9/723 382/209 |
| 8,249,347 B1 * | 8/2012 | Ramkumar | G06K 9/723 382/176 |
| 8,503,773 B2 * | 8/2013 | Kanatsu | G06K 9/00463 382/165 |
| 8,644,610 B1 * | 2/2014 | Ramkumar | G06K 9/723 382/176 |
| 9,104,700 B1 * | 8/2015 | Ramkumar | G06K 9/723 |

\* cited by examiner

*Primary Examiner* — Yosef Kassa
(74) *Attorney, Agent, or Firm* — Shook, Hardy & Bacon L.L.P.; Charlie Zhao

(57) ABSTRACT

Provided are a method and apparatus for identifying a product. The method includes: acquiring an image of the product; performing multilevel detection on the image to determine a label region of the product, specifically, an image region corresponding to a previous level of detection is greater than an image region corresponding to a following level of detection; and identifying information in the label region to determine information of the product. A product can be identified automatically by acquiring the image of the product and performing multilevel detection on the image, thereby efficiency is improved, a large number of products can be handled, and cost is reduced.

9 Claims, 1 Drawing Sheet

US 10,635,942 B2

METHOD AND APPARATUS FOR IDENTIFYING A PRODUCT

TECHNICAL FIELD

The present invention relates to the field of data identification, and particularly to a method and apparatus for identifying a product.

BACKGROUND ART

At present, in a shopping mall, the identification of products, such as the reading for barcode, are substantially performed manually. However, such manual identification cannot work well under a large number of products. In particular, the manual identification is inefficient, time-consuming and labor-consuming, and causes the labor cost to be higher and higher. That is, the manual identification would cause a high cost, and cannot effectively meet the current demand for identifying products.

Therefore, there is a need of a method which enables the products to be identified with high efficiency.

DISCLOSURE OF THE INVENTION

In view of the shortcomings in the prior art, embodiments of the present invention provide a method and apparatus for identifying a product. A product can be identified automatically by acquiring an image of the product and performing multilevel detection on the image, thereby the efficiency is improved, a large number of products can be handled, and the cost is reduced.

Specifically, the present invention proposes specific embodiments as follows.

An embodiment of the present invention provides a method for identifying a product. The method includes:
acquiring an image of the product;
performing multilevel detection on the image to determine a label region of the product, specifically, an image region corresponding to a previous level of detection is greater than an image region corresponding to a following level of detection; and
identifying information in the label region to determine information of the product.

In a specific embodiment, the step of performing multilevel detection on the image to determine a label region of the product includes:
dividing the image into a plurality of regions;
performing character identification on each of the plurality of regions to determine region(s) in which a character is identified; and
setting, as the label region of the product, a region which has characters in number equal to or greater than a preset threshold.

In a specific embodiment, the label region is a region which has characters in the largest number and a preset unit area.

In a specific embodiment, the step of performing multilevel detection on the image to determine a label region of the product includes:
dividing the image into a plurality of regions;
performing character identification on each of the plurality of regions to determine region(s) in which a character is identified;
judging whether the identified characters of each of the determined regions contain a preset character wherein if it is determined that the identified characters of a region contain the preset character, the region is set as the label region of the product.

In a specific embodiment, the step of identifying information in the label region to determine information of the product includes:
increasing a contrast ratio of the label region, and performing text identification on the label region, specifically, the text identification includes at least one of Chinese character identification, English character identification and symbol identification; and
acquiring the information of the product from a result of the identification.

An embodiment of the present invention further provides an apparatus for identifying a product. The apparatus includes:
an acquiring module configured to acquire an image of the product;
a detecting module configured to perform multilevel detection on the image, so as to determine a label region of the product; specifically, an image region corresponding to a previous level of detection is greater than an image region corresponding to a following level of detection; and
an identifying module configured to identify information in the label region to determine information of the product.

In a specific embodiment, the detecting module is configured to:
divide the image into a plurality of regions;
perform character identification on each of the plurality of regions to determine region(s) in which a character is identified; and
set, as the label region of the product, a region which has characters in number equal to or greater than a preset threshold.

In a specific embodiment, the label region is a region which has characters in the largest number and a preset unit area.

In a specific embodiment, the detecting module is configured to:
divide the image into a plurality of regions;
perform character identification on each of the plurality of regions to determine region(s) in which a character is identified;
judge whether the identified characters of each of the determined regions contain a preset character wherein if it is determined that the identified characters of a region contain the preset character, the region is set as the label region of the product.

In a specific embodiment, the identifying module is configured to:
increase a contrast ratio of the label region, and perform text identification on the label region, specifically, the text identification includes at least one of Chinese character identification, English character identification and symbol identification; and
acquire the information of the product from a result of the identification.

Thus, embodiments of the present invention provide the method and apparatus for identifying a product. The method includes: acquiring an image of the product; performing multilevel detection on the image to determine a label region of the product; specifically, an image region corresponding to a previous level of detection is greater than an image region corresponding to a following level of detection; and identifying information in the label region to determine information of the product. A product can be identified automatically by acquiring the image of the product and performing the multilevel detection on the image, thereby efficiency is improved, a large number of products can be handled, and the cost is reduced.

BRIEF DESCRIPTION OF DRAWINGS

In order to more clearly illustrate technical solutions of embodiments of the present invention, figures which are needed for the embodiments will be introduced briefly below. It should be understood that the figures below merely show some embodiments of the present invention, and therefore should not be considered as limiting the scope. For a person ordinarily skilled in the art, other relevant figures can also be obtained in light of these figures, without inventive effort.

DETAILED DESCRIPTION OF EMBODIMENTS

Figure 1:
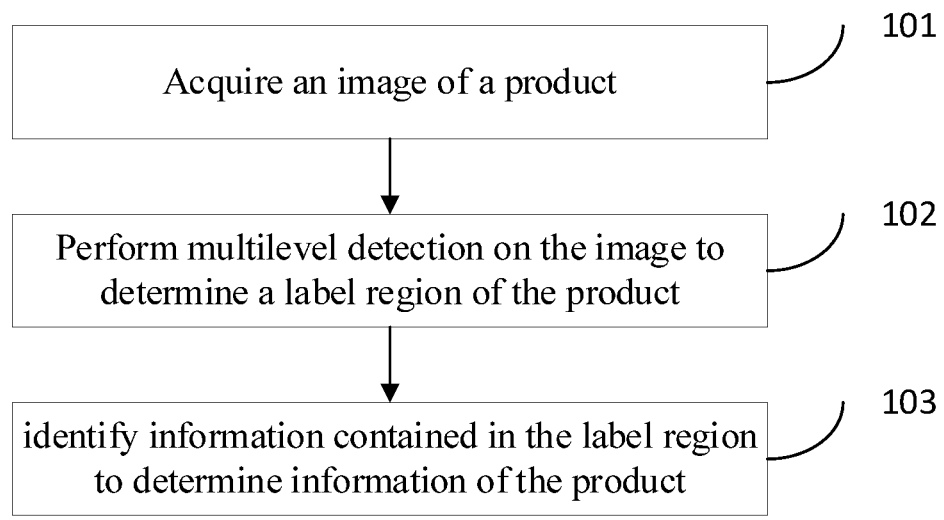
FIG. 1 is a schematic flow chart of a method for identifying a product provided by an embodiment of the present invention.

Hereinafter, various embodiments of the present disclosure will be described more comprehensively. The present disclosure may have various embodiments, and adjustments and modifications may be made thereto. However, it should be understood that various embodiments of the present disclosure are not indented to be limited to the particular embodiments disclosed herein, and therefore the present disclosure should be considered as encompassing all adjustments, equivalents and/or alternatives that fall within the spirit and scope of the various embodiments of the present disclosure.

Hereinafter, terms such as "include" or "may include" used in the various embodiments of the present disclosure indicate the presence of the disclosed functions, operations or elements, and do not restrict from adding one or more functions, operations or elements. In addition, as used in the various embodiments of the present disclosure, terms such as "include", "have" and the derivative versions thereof only intend to indicate particular features, numbers, steps, operations, elements, components or combinations thereof, but should not be construed as excluding the possibility that one or more other features, numbers, steps, operations, elements, components or the combinations thereof may be present, or that one or more features, numbers, steps, operations, elements, components or the combinations thereof may be added.

In the various embodiments of the present disclosure, the expression "or" or "at least one of A and/or B" includes any or all combinations of the listed items. For example, the expression "A or B" or "at least one of A and/or B" may include A, may include B or may include both A and B.

The expressions (such as "first" and "second") used in the various embodiments of the present disclosure may embellish various constituent elements of the various embodiments, but not limit the corresponding constituent elements. For example, the above expressions do not limit the sequence and/or importance of the elements. Such expressions are used only for the purpose of distinguishing one element from other elements. For example, a first user device and a second user device represent different user devices, though both are user devices. For example, a first element may be referred to as a second element, and similarly, a second element may be referred to as a first element, without departing from the scope of the various embodiments of the present disclosure.

It should be noted that, if a constituent element is described to be "connected" to another constituent element, it means that a first constituent element may be directly connected to a second constituent element, and a third constituent element may be connected between the first constituent element and the second constituent element. On the contrary, if a constituent element is "directly connected" to another constituent element, it may be interpreted that there is no third constituent element existing between the first constituent element and the second constituent element.

The term "user" used in the various embodiments of the present disclosure may indicate a person who uses an electronic device or a device which uses an electronic device (e.g. an artificial intelligent electronic device).

The terms used in the various embodiments of the present disclosure are used only for the purpose of describing the particular embodiments, rather than limiting the various embodiments of the present disclosure. As used herein, the singular forms intend to include plural referents unless the context clearly dictates otherwise. Unless otherwise specified, all terms (including technical terms and scientific terms) used herein have the same meaning as that commonly understood by one ordinary skilled in the art of the various embodiments of the present disclosure. The terms (such as those terms defined in a commonly used dictionary) are to be interpreted as having the same meaning as those used in the context of related technical fields, instead of being interpreted as having an ideal meaning or an excessive formal meaning, unless otherwise clearly defined in the various embodiments of the present disclosure.

First Embodiment

The first embodiment of the present invention discloses a method for identifying a product. As shown in FIG. 1, the method includes steps as follows.

In step 101, an image of the product is acquired.

Specifically, the image may be acquired by taking pictures of the product, and may also be acquired from a database storing the pictures.

In step 102, multilevel detection is performed on the image to determine a label region of the product. Specifically, an image region corresponding to a previous level of detection is greater than an image region corresponding to a following level of detection.

Specifically, in a particular embodiment, the multilevel detection may be performed on a picture as follows: the detection may firstly be performed on the entire image such that a region which contains no label information is excluded, such as a pure blank region or a pure picture region, and then identification is performed on the remaining regions, so as to improve the efficiency of identification.

In step 103, information in the label region is identified to determine information of the product.

In a specific embodiment, the step of performing multilevel detection on the image to determine a label region of the product includes:

dividing the image into a plurality of regions;

performing character identification on each of the plurality of regions to determine region(s) in which a character is identified; and setting, as the label region of the product, a region which has characters in number equal to or greater than a preset threshold.

In a specific embodiment, the label region is a region which has characters in the largest number and a preset unit area.

Specifically, the label region of the product may contain different kinds of information, and accordingly, there may be a large number of, most likely the largest number of, characters in the label region. For example, the information about the manufacturer, the production date, the brand, the model, the material composition, the cautions, the expiration date and the like may be included. Therefore, the label region may be determined based on the number of characters.

In a specific embodiment, the step of performing multilevel detection on the image to determine a label region of the product includes:
dividing the image into a plurality of regions;
performing character identification on each of the plurality of regions to determine region(s) in which a character is identified;
judging whether the identified characters of each of the determined regions contain a preset character wherein if it is determined that the identified characters of a region contain the preset character, the region is set as the label region of the product.

As mentioned above, there are some preset and fixed information in the label. For example, information about the manufacturer, the production date, the brand; the model, the material composition, the cautions, the expiration date and the like may be included. Therefore, after a blank region or a region with characters in a small number is excluded, the identification is performed on the remaining regions; and if the fixed information is identified in a region, such region will be regarded as the label region.

In a specific embodiment, the step of identifying information in the label region to determine information of the product includes:
increasing a contrast ratio of the label region, and performing text identification on the label region; specifically, the text identification includes at least one of Chinese character identification, English character identification and symbol identification; and
acquiring the information of the product from a result of the identification.

Specifically, considering that the label information includes Chinese characters, English words and symbols, the information in the label may be acquired by identifying the Chinese characters, the English words and the symbols, so as to acquire the information of the product for other subsequent processing, such as sales statistics.

Second Embodiment

Figure 2:
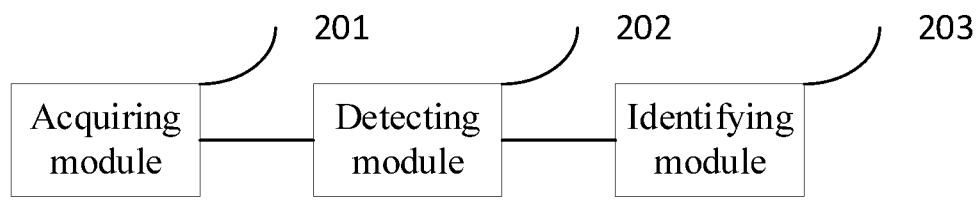
FIG. 2 is a schematic structural diagram of an apparatus for identifying a product provided by an embodiment of the present invention.

The second embodiment of the present invention further discloses an apparatus for identifying a product. As shown in FIG. 2, the apparatus includes:
an acquiring module 201 configured to acquire an image of the product;
a detecting module 202 configured to perform multilevel detection on the image, so as to determine a label region of the product; specifically, an image region corresponding to a previous level of detection is greater than an image region corresponding to a following level of detection; and
an identifying module 203 configured to identify information in the label region to determine information of the product.

In a specific embodiment, the detecting module 202 is configured to:
divide the image into a plurality of regions;
perform character identification on each of the plurality of regions to determine region(s) in which a character is identified; and
set, as the label region of the product, a region which has characters in number equal to or greater than a preset threshold.

In a specific embodiment, the label region is a region which has characters in the largest number and a preset unit area.

In a specific embodiment, the detecting module 202 is configured to:
divide the image into a plurality of regions;
perform character identification on each of the plurality of regions to determine region(s) in which a character is identified;
judge whether the identified characters of each of the determined regions contain a preset character wherein if it is determined that the identified characters of a region contain the preset character, the region is set as the label region of the product.

In a specific embodiment, the identifying module 203 is configured to:
increase a contrast ratio of the label region, and perform text identification on the label region; specifically, the text identification includes at least one of Chinese character identification, English character identification and symbol identification; and
acquire the information of the product from a result of the identification.

Third Embodiment

The third embodiment of the present invention further discloses a terminal.

The terminal includes:
a processor;
a memory configured to store instructions executable by the processor,
where the processor is configured to:
acquire an image of a product;
perform multilevel detection on the image to determine a label region of the product; specifically, an image region corresponding to a previous level of detection is greater than an image region corresponding to a following level of detection; and
identify information in the label region to determine information of the product.

In a specific embodiment, the performing multilevel detection on the image to determine a label region of the product includes:
dividing the image into a plurality of regions;
performing character identification on each of the plurality of regions to determine region(s) in which a character is identified; and
setting, as the label region of the product, a region which has characters in number equal to or greater than a preset threshold.

In a specific embodiment, the label region is a region which has characters in the largest number and a preset unit area.

In a specific embodiment, the performing multilevel detection on the image to determine a label region of the product includes:
dividing the image into a plurality of regions;
performing character identification on each of the plurality of regions to determine region(s) in which a character is identified;
judging whether the identified characters of each of the determined regions contain a preset character wherein if it is determined that the identified characters of a region contain the preset character, the region is set as the label region of the product.

In a specific embodiment, the identifying information in the label region to determine information of the product includes:
increasing a contrast ratio of the label region, and performing text identification on the label region; specifically, the text identification includes at least one of Chinese character identification, English character identification and symbol identification; and acquiring the information of the product from a result of the identification.

Therefore, embodiments of the present invention provide the method and apparatus for identifying a product. The method includes: acquiring the image of the product; performing the multilevel detection on the image to determine the label region of the product, specifically, the image region corresponding to a previous level of detection is greater than the image region corresponding to a following level of detection; and identifying information in the label region to determine information of the product. A product can be identified automatically by acquiring the image of the product and performing multilevel detection on the image, thereby efficiency is improved, a large number of products can be handled, and the cost is reduced.

A person skilled in the art can understand that the drawings are merely schematic diagrams of a preferred implementation scenario, and the modules or procedures in the drawings are not necessarily required when implementing embodiments of the present invention.

A person skilled in the art can understand that modules in a device of an implementation scenario may be distributed in the device of the implementation scenario according to the description of the implementation scenario, and may also be distributed in one or more devices in a way different from the present implementation scenario, after subjecting corresponding changes. The modules in the abovementioned implementation scenarios may be combined into one module, and may be further divided into multiple sub-modules.

The above serial number of the implementation scenarios of the present invention is merely for the purpose of description and does not represent the preference of the implementation scenarios.

The above disclosure is just several specific implementation scenarios of the present invention. However, the present invention is not limited thereto, and any changes that may occur to a person skilled in the art should fall within the scope of protection of the present invention.

The invention claimed is:

1. A computer-implemented method for identifying a product, comprising:
acquiring an image of the product;
dividing the image into a first plurality of regions;
performing character identification on each of the first plurality of regions;
selecting, from the first plurality of regions, a second plurality of regions having identified characters greater than a preset threshold;
determining, from the second plurality of regions, a region having a greatest number of characters in a preset unit area;
increasing a contrast ratio of the region;
identifying a text on the region with the increased contrast ratio;
and
identifying information of the product based on the text on the region.

2. The method according to claim 1, further comprising: determining the region having a plurality of preset characters.

3. An apparatus for identifying a product, comprising:
an acquiring module configured to acquire an image of the product;
a detecting module configured to determine a label region of the product by:
dividing the image into a first plurality of regions;
performing character identification on each of the first plurality of regions;
selecting, from the first plurality of regions, a second plurality of regions having identified characters greater than a preset threshold;
determining, from the second plurality of regions, a region having a greatest number of characters in a preset unit area;
selecting the region as the label region; and
an identifying module configured to identify information of the product based on information in the label region.

4. The apparatus according to claim 3, wherein the detecting module is further configured to:
increase a contrast ratio of the label region; and
identify a text on the label region with the increased contrast ratio;
wherein the identifying module configured to:
identify the information of the product based on the text.

5. The apparatus according to claim 3, wherein the detecting module is configured to determine the label region having a plurality of preset characters.

6. One or more non-transitory computer storage media comprising computer-implemented instructions that, when used by one or more computing devices, cause the one or more computing devices to:
acquire an image of a product;
divide the image into a plurality of regions;
conduct character identification operations on each of the plurality of regions;
determine, among the plurality of regions, a label region having a highest character density, wherein the highest character density corresponds to a greatest number of characters in a preset unit area; and
identify the product based on information on the label region.

7. The one or more computer storage media of claim 6, the instructions further cause the one or more computing devices to:
increase a contrast ratio of the label region; and
identify a text on the label region with the increased contrast ratio.

8. The one or more computer storage media of claim 7, the instructions further cause the one or more computing devices to:
identify the product based on the text on the label region.

9. The one or more computer storage media of claim 6, the instructions further cause the one or more computing devices to:

determine the label region having a plurality of preset characters related to the product.

\* \* \* \* \*